United States Patent
Verma et al.

(10) Patent No.: US 8,250,513 B1
(45) Date of Patent: Aug. 21, 2012

(54) PARALLEL PROCESS OPTIMIZED SIGNAL ROUTING

(75) Inventors: Vinay Verma, Fremont, CA (US); Gitu Jain, Los Gatos, CA (US); Sanjeev Kwatra, Cupertino, CA (US); Taneem Ahmed, Toronto (CA); Sandor S. Kalman, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 13 days.

(21) Appl. No.: 12/939,765

(22) Filed: Nov. 4, 2010

(51) Int. Cl.
*G06F 17/50* (2006.01)
*G06F 9/455* (2006.01)

(52) U.S. Cl. ........ 716/126; 716/130; 716/131; 716/135; 716/110

(58) Field of Classification Search .................. None
See application file for complete search history.

(56) References Cited

U.S. PATENT DOCUMENTS

| | | | | |
|---|---|---|---|---|
| 5,587,923 | A * | 12/1996 | Wang | 716/129 |
| 5,784,289 | A * | 7/1998 | Wang | 716/122 |
| 5,875,117 | A | 2/1999 | Jones et al. | |
| 6,412,102 | B1 | 6/2002 | Andreev et al. | |
| 6,480,991 | B1 * | 11/2002 | Cho et al. | 716/122 |
| 7,134,112 | B1 | 11/2006 | Anderson et al. | |
| 7,707,536 | B2 * | 4/2010 | Lin et al. | 716/126 |
| 8,095,906 | B2 | 1/2012 | Betz et al. | |
| 2001/0018759 | A1 | 8/2001 | Andreev et al. | |
| 2002/0184607 | A1 * | 12/2002 | Alpert et al. | 716/15 |
| 2003/0005398 | A1 * | 1/2003 | Cho et al. | 716/8 |
| 2007/0094631 | A1 | 4/2007 | Galatenko et al. | |
| 2007/0220522 | A1 | 9/2007 | Coene et al. | |
| 2010/0169858 | A1 | 7/2010 | Betz et al. | |

OTHER PUBLICATIONS

U.S. Appl. No. 12/718,945, filed Mar. 5, 2010, Jain et al.
U.S. Appl. No. 12/853,810, filed Aug. 10, 2010, Kingsley et al.
U.S. Appl. No. 12/939,732, filed Nov. 4, 2010, Kalman et al.
McMurchie, Larry et al., "PathFinder: A Negotiation-Based Performance-Driven Router for FPGAs," *Proc. of the Third International ACM Symposium on Field-Programmable Gate Arrays*, Feb. 12, 1995, pp. 111-117, ACM. New York, New York, USA.

* cited by examiner

*Primary Examiner* — Leigh Garbowski
*Assistant Examiner* — A. M. Thompson
(74) *Attorney, Agent, or Firm* — LeRoy D. Maunu; Lois D. Cartier (57) ABSTRACT

In one embodiment, a method for routing of a circuit design netlist is provided. A processing cost is determined for each net in the netlist. A plurality of regions are defined for the target device such that the total processing costs of nets are balanced between the plurality of regions. Concurrent with routing one or more nets of a first one of the plurality of regions, one or more nets are routed in at least one other of the plurality of regions. Synchronization and subsequent routing are performed for unrouted nets of the netlist.

20 Claims, 6 Drawing Sheets

PARALLEL PROCESS OPTIMIZED SIGNAL ROUTING

FIELD OF THE INVENTION

The embodiments of the present invention generally relate to the placement and routing of circuits.

BACKGROUND

Programmable integrated circuits (ICs) are often used to implement digital logic operations according to user configurable input. Example programmable ICs include complex programmable logic devices (CPLDs) and field programmable gate arrays (FPGAs). CPLDs often include several function blocks that are based on programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that determine how the CLBs, IOBs, and interconnect structure function. The configuration bitstream may be read from an external memory, conventionally an external integrated circuit memory EEPROM, EPROM, PROM, and the like, though other types of memory may be used. The collective states of the individual memory cells determine the function of the FPGA. A specific type of FPGA uses a look-up-table (LUT)-based CLB. The configuration memory provides input values to a number of multiplexers that are controlled by inputs to the CLB.

A conventional design process for an integrated circuit, such as an ASIC or an FPGA implementation begins with the creation of the design. The design specifies the function of a circuit at a schematic or logic level and may be represented using various hardware description languages (e.g., VHDL, ABEL, or Verilog) or schematic capture programs. The design is synthesized to produce a logical network list ("netlist"), and the synthesized design is mapped onto primitive components within the target device (e.g., programmable logic blocks of an FPGA).

Following mapping, placement of the components of the synthesized and mapped design is then performed for the target device. During placement, each mapped component of the design is assigned to a physical position on the chip. The placer attempts to place connected design objects in close physical proximity to one another in order to conserve space and increase the probability that the desired interconnections between components will be successfully completed by the router. Placing connected components close to one another also generally improves the performance of the circuit since long interconnect paths are associated with excess capacitance and resistance, resulting in longer delays and greater power consumption.

Specified connections between components of the design are routed within the target device for the placed components. The routing process specifies physical wiring resources that will be used to conduct signals between pins of placed components of the design. For each connection specified in the design, the routing process allocates wire resources necessary to complete the connection. As used herein, the selection and assignment of wire resources in connecting the output pin of one component to the input pin of another component is referred to as routing a net. When nets have been routed using most or all of the wiring resources in a given area, the area is generally referred to as congested, which creates competition for the remaining wiring resources in the area or makes routing of additional nets in the area impossible.

Most current programmable integrated circuit (IC) routing tools are based on a negotiated congestion resolution scheme. In a typical implementation, for example, the Pathfinder algorithm, nets are routed sequentially. A path through the programmable resources of the programmable IC is determined by an expansion of possible paths from a source to a destination. In the process of routing a net, other nets may have been already routed on the wire resources required to route the unrouted signal. When two nets use the same resource, it is known as congestion. During expansion, a cost of resource use for each possible path is tracked and maintained during expansion of the possible paths to reflect the demand for use of each resource for routing. In response to two or more nets attempting to route with the same resource, the cost of the congested resource is increased and the conflicting nets are rerouted. The increased resource cost encourages any subsequently routed nets to be routed using other (less expensive) resources. Nets having limited routing resources available to provide a possible path from the source to the destination may use the congested resources if those resources provide the least expensive path in spite of their increased cost. In this manner, nets are iteratively routed while adjusting resource costs to find a solution.

Because the routing of each net increases the cost of some resources, the routing of subsequently routed nets may be affected. The final routing result is determined, in part, by the order in which nets are routed. Therefore, in order to produce deterministic results, the nets must be routed in the same order every time routing is performed.

However, when two or more nets are routed in parallel, it can be difficult to control the order in which nets are routed due to unexpected or critical dependencies known as race conditions. For example, when a processor performs a read of a memory, the time to complete the memory access may depend on the number of other processes attempting to perform read operations. The order in which concurrently routed nets are routed may be similarly affected by memory access delays as the processors attempt to read and update congestion data.

The disclosed embodiments may address one or more of the above issues.

SUMMARY

In one embodiment described herein, a method for routing of a circuit design netlist using one or more programmed processors is provided. Placement of a netlist of the circuit design on a target device is determined. A processing cost is determined for each net in the netlist. A plurality of regions are defined for the target device such that the total processing costs of nets are balanced between the plurality of regions. Concurrent with routing one or more nets of a first one of the plurality of regions, one or more nets are routed in at least one other of the plurality of regions. Any unrouted nets of the netlist are then routed.

The plurality of regions are mutually exclusive in another embodiment.

In another embodiment, each net of the one or more nets of the first region and the at least one other region is located exclusively within the respective region.

Each of the plurality of regions of the target device is separated from other regions in the plurality of regions by a buffer region in another embodiment.

The one or more nets within each region including the first region and the at least one other region, are routed as a function of congestion between the one or more nets.

In another embodiment, the processing cost for each net is a function of a Manhattan distance between a source of the net and a load of the net that is furthest from the source.

The processing cost for each net, in another embodiment, is a function of a total distance from a source of the net to each load of the net.

The total distance is a Manhattan distance from the source to all loads of the net in another embodiment.

In another embodiment, the determining of the processing cost for each net in the netlist includes determining a bounding box of the net and determining a perimeter of the bounding box.

The determining of the processing cost for each net in the netlist, in another embodiment, uses a first cost function for non-critical nets in the netlist and uses a second cost function for critical nets in the netlist.

The plurality of regions is equal in number to a number of processors available to perform the routing processes in another embodiment.

In another embodiment, the plurality of regions is greater in number than a number of processors available to perform the routing processes. The processors concurrently route the one or more nets of the first region with the one or more nets in the at least one other region.

Unrouted nets of the netlist, in another embodiment, are routed by deterministically grouping two of more unrouted nets of the netlist into a plurality of sub-netlists and concurrently routing the plurality sub-netlists.

In another embodiment, congestion history between nets of the netlist is determined. Each net of each sub-netlist of the plurality of sub-netlists is routed as a function of the determined congestion history between nets of the netlist and congestion between nets of the sub-netlist. The routing function is not dependent on congestion between nets of other sub-netlists in the plurality of sub-netlists.

In another embodiment, the routing of unrouted nets of the netlist further includes, in response to two or more nets of the netlist being routed through the same routing resource, updating the congestion history between nets in the netlist and undoing routes of the two or more nets of the netlist. The two of more nets are deterministically grouped into a revised plurality of sub-netlists. The sub-netlists of the revised plurality of sub-netlists are concurrently routed as a function of the determined congestion history between nets of the netlist and congestion between nets of the sub-netlist. The routing function is not dependent on congestion between nets of other sub-netlists in the revised plurality of sub-netlists.

A respective first route is determined, in another embodiment, for each net of the netlist as a function of a shortest path between a source of the net and one or more loads of the net. The function is not dependent on congestion between nets of the netlist. A congestion probability is determined for each net in the netlist from the determined first route as a function of the shortest path. The processing cost for each net in the netlist is determined in part by determining the processing cost as a function of a Manhattan distance between the source and at least one load of the net and the congestion probability.

In yet another embodiment, a system for routing a circuit design is provided. The system includes a plurality of processors and a memory arrangement coupled to the plurality of processors. The memory arrangement is configured with instructions that when executed by one or more of the plurality of processors cause the plurality of processors to determine a processing cost for each net in the netlist and define a plurality of mutually exclusive regions of the target device. The regions are defined such that the total processing costs of nets within the plurality of regions are balanced between the plurality of regions. The instructions further cause the plurality of processors to concurrently route nets within a first one of the plurality of mutually exclusive regions with nets within at least one other of the plurality of regions. The instructions cause the processors to then route unrouted nets of the netlist.

In another embodiment, the processing cost for each net is determined as a function of a Manhattan distance between a source of the net and a load of the net that is furthest from the source.

The instructions further cause the plurality of processors to determine independent respective first route for each net of the netlist as a function of the shortest path between a source of the net and one or more loads of the net in another embodiment. The function is not dependent on congestion between nets of the netlist. The instructions further cause the plurality of processors to determine a congestion probability for each net in the netlist from the determined first route. Determining the processing cost for each net in the netlist includes determining the processing cost as a function of a Manhattan distance between the source of the net and one or more loads of the net and the congestion probability.

In yet another embodiment, an article of manufacture is provided. A non-transitory processor-readable storage medium is configured with processor-executable instructions for processing a circuit design, the instructions when executed by one or more of a plurality of processors causing the plurality of processors to route the nets of the netlist as a function of the shortest path, which is not dependent on congestion between nets of the netlist, and determine a processing cost for each net in the netlist and define a plurality of mutually exclusive regions of the target device. The regions are defined such that the total processing costs of nets within the plurality of regions are balanced between the plurality of regions. The instructions further cause the plurality of processors to concurrently routed nets within a first one of the plurality of mutually exclusive regions with nets within at least one other of the plurality of regions. The instructions cause the processors to then route unrouted nets of the netlist.

It will be appreciated that various other embodiments are set forth in the Detailed Description and Claims, which follow.

BRIEF DESCRIPTION OF THE DRAWINGS

Various aspects and advantages of the embodiments of the invention will become apparent upon review of the following detailed description and upon reference to the drawings, in which.

DETAILED DESCRIPTION

The task of the routing process is to map the nets in the design onto routing resources of a target device so there are no shorts between the nets. The process of finding a valid route for all nets in a manner that minimizes some measure of cost is an NP-Hard problem. In the future, it is expected that processor cores will not increase in speed, but computers will be built with many cores that execute processes in parallel. Utilizing a multi-core architecture, one method to reduce the time needed for signal routing involves routing nets in parallel using multiple processors. However, due to race conditions, parallel routing of nets may produce non-deterministic results. Non-deterministic algorithms generally utilize a random seed to produce a random number that is used to select circuits for placement and routing. One disadvantage of non-deterministic algorithms is that they do not consistently produce satisfactory results. Non-deterministic algorithms may be required to be executed a large number of times before satisfactory results are achieved and confirmed. In contrast, deterministic algorithms use a specific, unchanging method, in which satisfactory results are consistently achieved after a single run.

In many parallel routing algorithms, non-deterministic results are avoided by performing routing over several iterations, where several processors independently route individual nets in parallel, and results are synchronized after each routing iteration before moving forward. In such multi-processor systems, the performance may be adversely affected by improper load balancing. Load balancing refers to the distribution of processing tasks among threads so that all threads are kept busy all of the time. If processors are assigned disproportionate amounts of work, the processors may finish assigned work at different times. As a result, one or more processors may remain idle after completing assigned routing tasks while waiting for other processors to reach the synchronization point. One or more of the described embodiments provide a load-balanced and deterministic method for routing nets in parallel Synchronization is computationally expensive because the parallel processes typically remain idle until synchronization processing has completed. Overall processing time may be reduced by decreasing processing time needed for and frequency of synchronization. The amount of work a thread performs before it synchronizes with other threads is called granularity. The coarser the granularity (i.e., the more routing work performed between synchronization points), the better the speed improvement that will be realized when executed on multi-processor systems because processors will not remain idle during synchronization. A larger granularity may speed up the parallel processing because less overall time is utilized for synchronization because processors are assigned new tasks less frequently. However, larger granularity generally introduces greater performance penalties when improper load balancing occurs.

Figure 1:
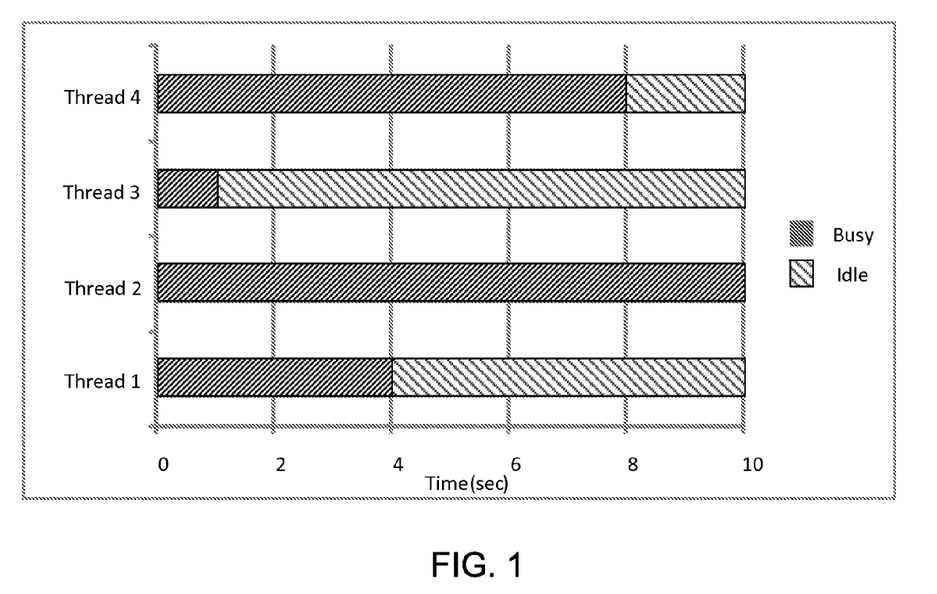
FIG. 1 shows a graph illustrating parallel processing performance with an unbalanced load between threads.

FIG. 1 illustrates an example parallel process exhibiting poor load balancing between threads. In this example, four process threads 1-4 are assigned a total of 23 units of processing tasks to be performed before the next synchronization point. Each unit of a processing task is assumed to correspond to one second of processing by a thread. As shown, the workload is not evenly distributed. The time needed by process thread 3 is less than the amount of time needed for process thread 2 to complete. As a result, process thread 3 remains idle for a large portion of the iteration. In this unbalanced example, overall processing time before a synchronization point is reached is equal to 10 seconds.

Figure 2:
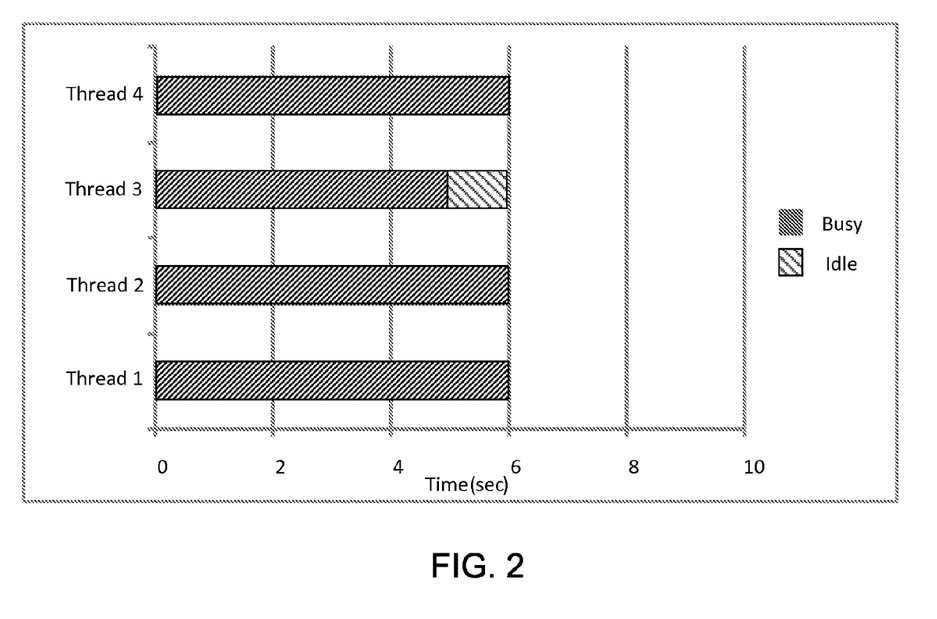
FIG. 2 shows a graph illustrating parallel processing performance with a generally balanced load between threads.

In contrast, FIG. 2 illustrates an example parallel process exhibiting good load balancing between threads. As illustrated, the 23 units of processing tasks of FIG. 1 are redistributed evenly among the four processing threads. As a result, each thread finishes the assigned processing tasks at nearly the same time. Little processing time is wasted with idle threads, and overall processing time before a synchronization point is reached is reduced to 6 seconds. One skilled in the art will recognize that it may not be possible to balance the processing tasks so probable routing time of all threads are equal. This may result anytime the total probable routing time is not divisible by the number of regions defined. Likewise due to placement and concentration of the nets on the target device it may not be feasible to define regions having equal probable routing time without having a majority of nets falling into both regions. As used herein balanced means as close to equal as possible given the size and divisibility of the estimated processing tasks, geographic location of the nets, and user-defined constraints.

In one or more embodiments, a method is provided for partitioning the routing of a netlist into coarse grain tasks that can be distributed among the multiple processors to achieve a good load balance without affecting routing results negatively. As described in detail below, in defining the plurality of nets, load balancing is performed by determining the probable processing time required to route each net and choosing boundaries for regions of the routing space such that the total probable processing time required to route nets in each region is substantially balanced.

Figure 3:
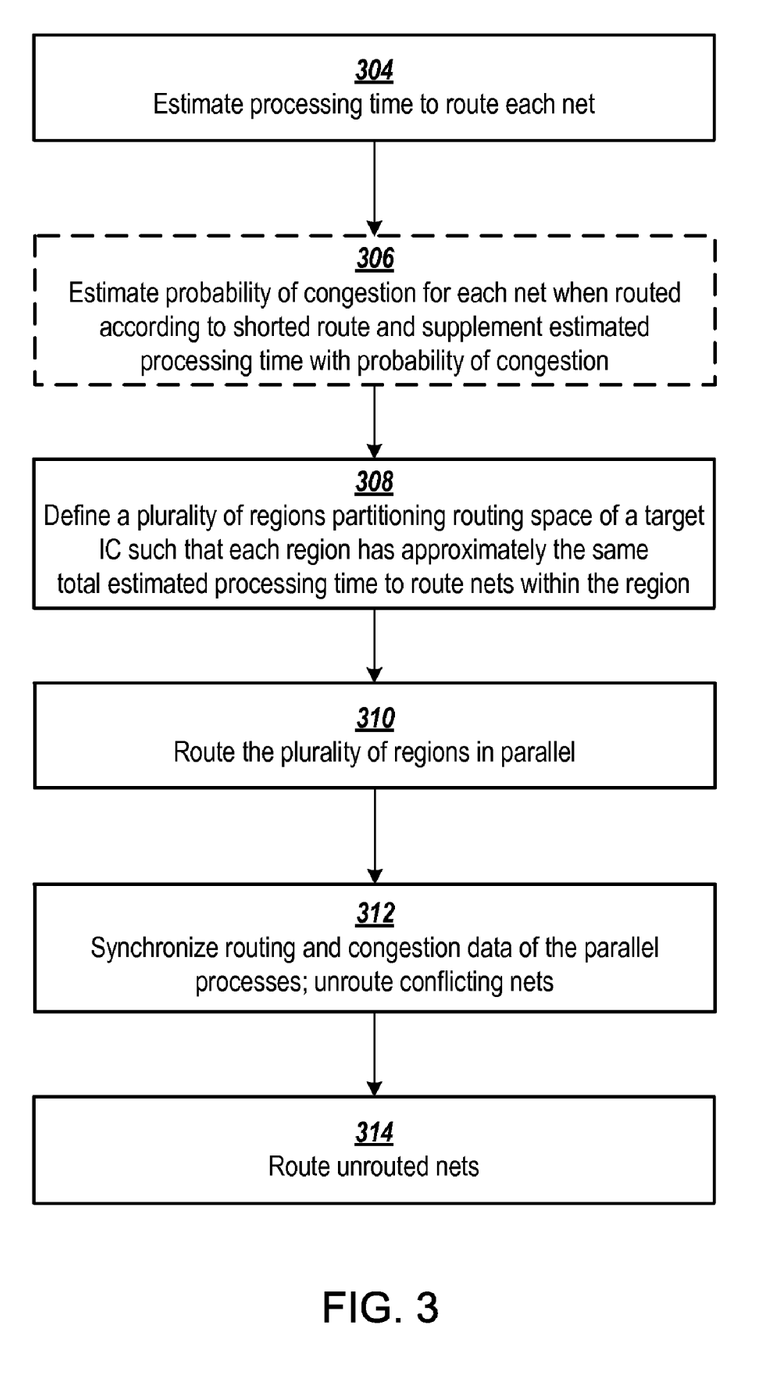
FIG. 3 shows a flowchart of an example process for parallel routing of a circuit design netlist.

FIG. 3 shows a flowchart of an example process for performing deterministic parallel routing of a circuit design netlist. An estimated processing time required to route each net of the netlist is determined at block 304. One skilled in the art will recognize that a number of different processing cost functions may be used to estimate the processing time needed to route each net. For example, the Manhattan distance between two or more endpoints of a net provides an indication of the routing processing time. The Manhattan distance is the distance between two points measured along the x and y axes $|x1-x2|+|y1-y2|$. In one example implementation, the Manhattan distance of a net may be determined from the perimeter of a bounding box that encompasses all nodes of a net. In another embodiment, the total wire length of each net may be used as the processing cost function. The total wire length of each net is equal to the sum of the Manhattan distances from a source to all loads of the net. This is an effective way to determine a probable processing cost as it is perceived that the time to route a net is directly proportional to the wire length of the net.

In some embodiments, a probable congestion of each net may also be determined at block 306 to achieve a more accurate estimation of processing time required for routing. The probable congestion may be determined by independently routing each net as a function of the shortest path between the source to the load(s) of each net. Because the nets are routed independently, more than one net may be routed through each routing resource. The congestion resulting from the shortest path routing is used to determine a probable congestion that each net will encounter when routed. The determined probable congestion is used to supplement the estimated processing time of the net. For example, heavily congested regions are likely to require a longer amount of processing time than regions having little congestion. As a result, the region boundaries may be adjusted to balance the processing time based upon the more accurate estimation.

A plurality of mutually exclusive regions of the routing space of a target device is defined at block 308. The boundaries of the regions are defined such that the total estimated processing time for routing of the nets is balanced between the plurality of regions. Nets of each region are routed in parallel with nets of the other ones of the plurality of regions at block 310. The regions are routed in parallel with congestion data maintained in respective independent sets. The independent sets of congestion data ensure that routing of one region does not affect the congestion data used in routing of the other regions.

Figure 5:
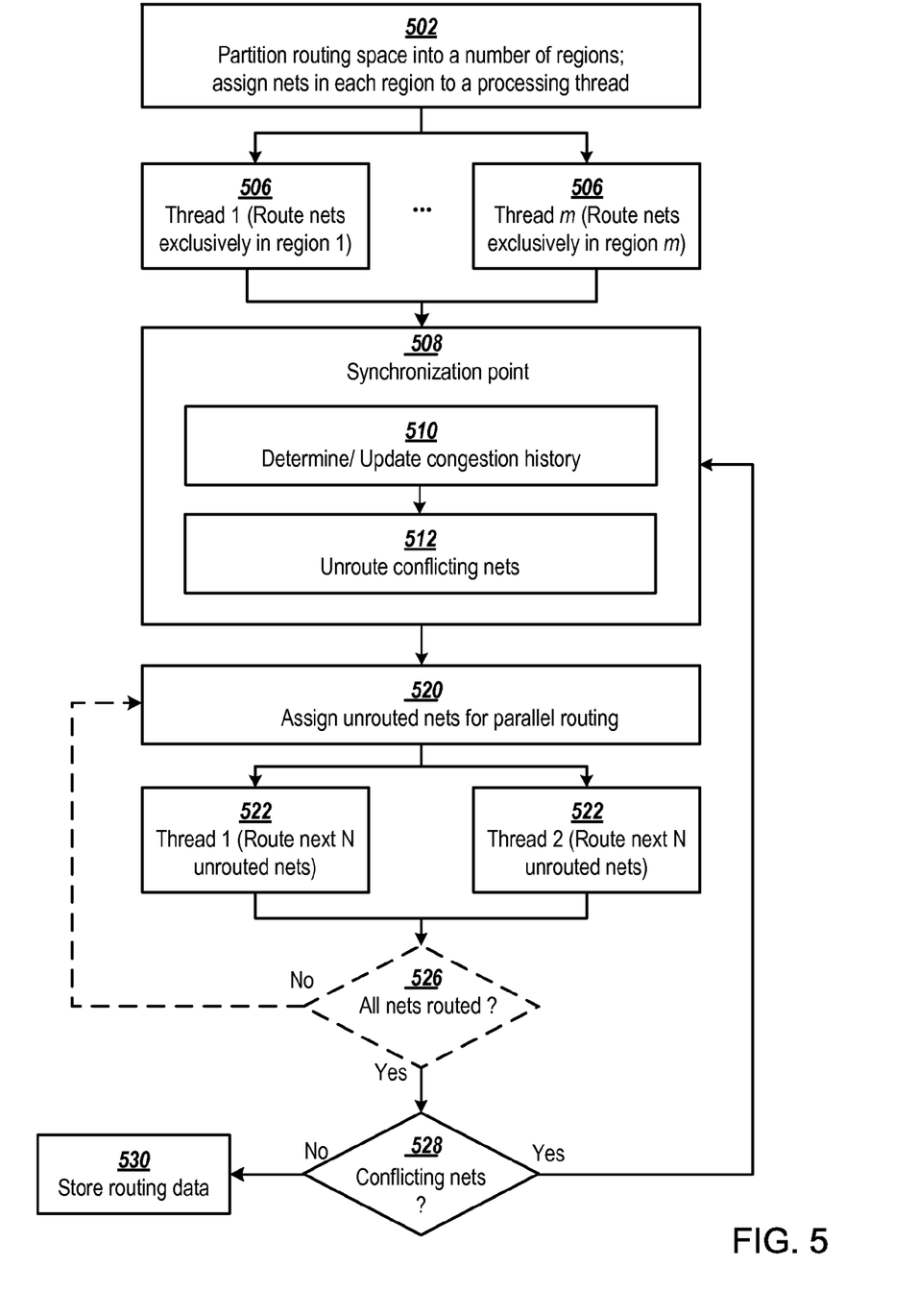
FIG. 5 shows a flowchart of an example process for deterministic parallel routing of a netlist.

After the routing operations have completed, the routing and congestion data of the plurality of regions are synchronized at block 312. At this synchronization point, the routed subnets are combined and analyzed to identify conflicting nets and update congestion data for the entire netlist. Any conflicting nets are also unrouted at block 312. The conflicting nets may then be rerouted at block 314, with congestion data updated to the synchronized set of congestion data. The rerouting of the conflicting nets may be performed using any of a variety of known techniques. Alternatively, the rerouting may be performed as shown in FIG. 5 and described below. Because congestion data is updated for each of the conflicting nets at the same time (e.g. before any of the conflicting nets are rerouted), race conditions leading to non-determinism may be avoided.

In addition to the improved efficiency provided by the load balancing, because the routed nets are exclusive to a particular region, there is less likely to be nets of one region found to be conflicting with nets of another region during synchronization. Nets within the same region, i.e. those most likely to conflict, are routed as a function of congestion between nets of the region. Therefore, as the nets of the region are routed, congestion data will cause the nets to converge on a routable solution within each region. As a result, the method will converge on a routable solution for the entire faster.

Figure 4:
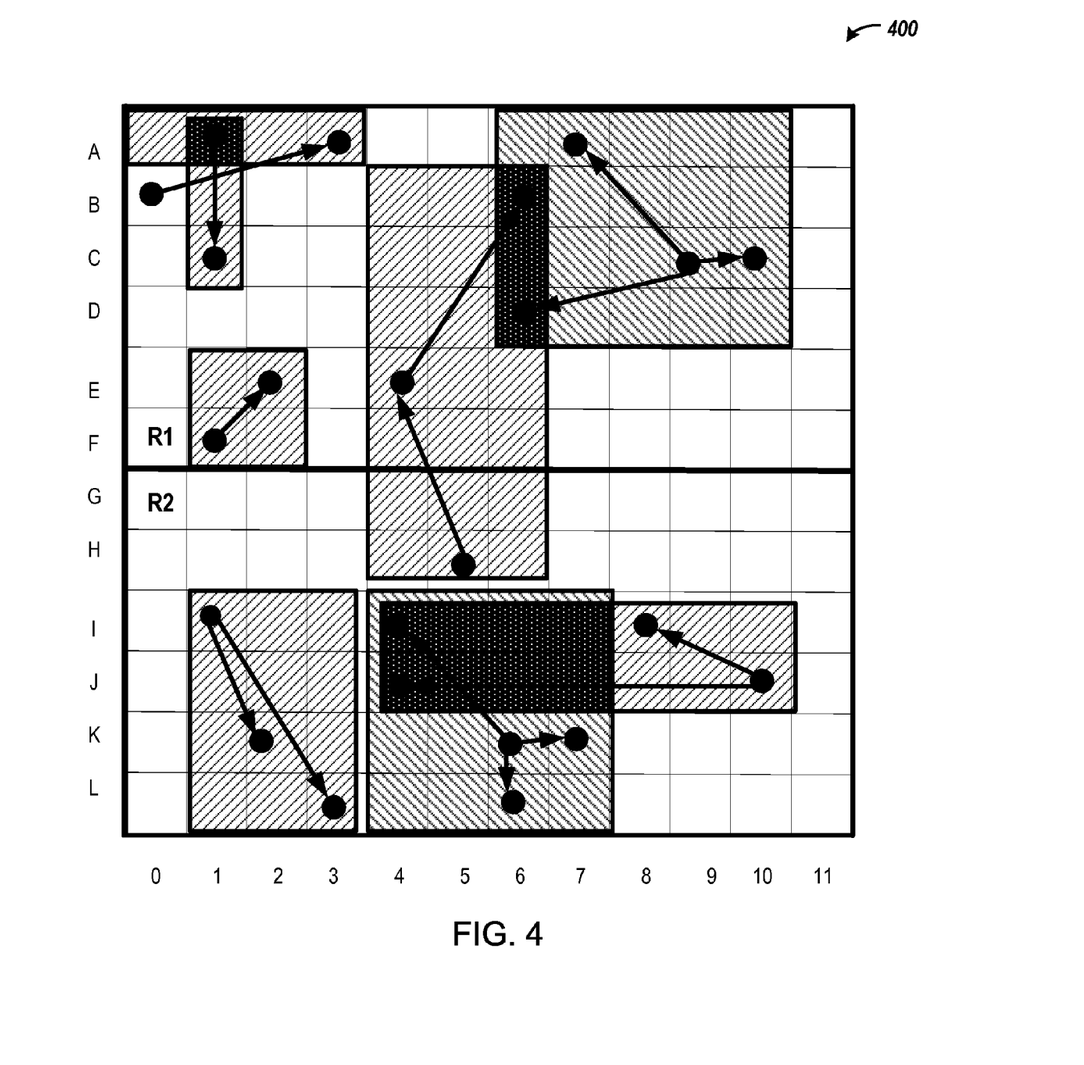
FIG. 4 illustrates an example partitioning of a routing space into a plurality of load balanced regions.

FIG. 4 illustrates an example showing the partitioning of routing space 400 into a plurality of load-balanced regions. In this example, the routing space is partitioned into two regions, R1 and R2. Region R1 includes rows A through F and region R2 includes rows G through L. The border between the regions is not fixed but rather may be adjusted according to the estimated processing time for routing of nets within each region.

As discussed above, an estimated processing cost is determined for each net according to a processing cost function. In this example, the processing cost is estimated from a calculation of the Manhattan distance by computing the perimeter of a bounding box for each net. The bounding box is a rectangular region that contains all terminals of a net. For example, the net originating at 11 has a bounding box including rows I through L and columns 1 through 3. The perimeter of a bounding box is used to estimate the amount of processing needed to route a net from one corner of the box to the other. The regions may be adjusted to balance the total length of the bounding box perimeters within each region.

In one or more embodiments, the routing performed at block 310 only routes nets that are exclusively within each region. Nets, which pass through multiple regions, are routed in a subsequent routing iteration such as the routing of unrouted nets at block 314. The premise is that if the terminals of a net are completely contained in a geographical region, the chosen route of the net will likely be completely within the region. The thread(s) assigned each region maintains a respective set of congestion data for the region during routing. Because threads assigned to the same region route according to the same congestion data, the nets are routed to avoid any overlap. Therefore, nets of different regions will be unlikely to conflict with nets of other regions.

In practice, the routing of a region may route a net using a route outside of the region. The resulting routing in one region may conflict with that of a neighboring region for two or more nets. Conflicting nets are identified during synchronization and are rerouted in subsequent routing at block 314 along with routing of other nets to be routed.

One skilled in the art will recognize that nets having terminals close to the boundaries are more likely to conflict with the routing of one or more nets of a neighboring region. To minimize conflicting routes, in at least one embodiment, a buffer zone is included between of the defined regions. Any net with a terminal in the buffer zone is treated as though it is not exclusively within one region and will be routed along with conflicting nets in subsequent routing iterations at block 314. For example, the illustration shown in FIG. 4 may have a buffer zone between regions R1 and R2 that includes rows F and G. Although the net originating at F1 is exclusively within region R1, it is partially located within the buffer zone and may be routed in subsequent routing.

Although some nets may not be successfully routed in the first routing iteration (FIG. 3, block 310), a large percentage of the nets are likely to be successfully routed in a deterministic and load balanced manner. One skilled in the art will recognize that the subsequent routing of unrouted nets may route the nets yet to be successfully routed according to a number of different methods. In one embodiment, nets are grouped for subsequent routing iterations according to an estimated processing cost to balance loads as described above in relation to the first routing iteration at block 310. Depending on the implementation, this grouping may or may not be based on geographic regions as discussed above. Because the number of nets yet to be routed should be decreased significantly, the performance benefit from load balancing may be less than the overhead needed to determine/update probable processing times and perform load balancing. In one embodiment, nets to be routed in a subsequent routing iteration may be grouped and routed without load balancing.

In yet another embodiment, nets routed in a subsequent routing iteration may be processed with dynamic load balancing. In dynamic load balancing, nets to be routed are divided into groups of N nets according to a deterministic selection algorithm. Each processor is initially assigned a group of N nets to route. When a processor finishes routing the assigned group of nets, the processor is assigned the next group of N nets to route, and the process is repeated until each group has been routed. Once all groups of nets have been routed, the routing of the nets is synchronized. In this manner, processing tasks are assigned on the fly to provide dynamic load balancing. For ease of description, load balancing performed by determining estimated processing times and grouping nets into load-balanced regions may be referred to as static load balancing.

FIG. 5 shows a flowchart of an example load-balanced process for deterministic, parallel routing of a netlist in accordance with one or more embodiments. In this example, routing is performed in iterations separated by synchronization points. The first routing iteration is performed with static load balancing and subsequent routing is performed with dynamic load balancing. The routing space of a target IC is partitioned into a plurality of regions at block 502 according to static load balancing as described in FIG. 3. For each region, nets exclusively within the region are routed at blocks 506 according to congestion between nets within the region. The example process illustrates m threads for routing the nets in m regions. To ensure deterministic results, the congestion data for each region is maintained in an independent local set of congestion data until synchronized.

At synchronization point 508, conflicting nets are determined and congestion data is updated to reflect routing conflicts between nets of different regions. Congestion history is updated to reflect congestion between all nets of the netlist at block 510. Conflicting nets are unrouted at block 512.

In this example, any nets remaining to be routed are routed in subsequent routing iterations at process blocks 520 and 522. The nets remaining to be routed are grouped into sub-netlists of N nets, and the sub-netlists are assigned to processors for routing at block 520. The nets remaining to be routed may include conflicting nets that were unrouted at block 512 as well as any nets that were not assigned at block 502 to be routed in the first routing iteration at blocks 506. The routing of blocks 522 is performed in a manner similar to the routing performed at block 506. Each group of nets (sub-netlist) is routed at block 522 according to the synchronized congestion history from previous routing iterations. While routing each group of nets, an independent local set of congestion data is used to track congestion between nets of the group. The congestion history from previous routing iterations is not modified until synchronization point 508 is reached (if further routing is needed).

In some implementations, if a processor finishes routing a group early, decision block 526 checks to see if more groups remain to be routed in the iteration. If groups to be routed remain, process block 520 assigns the next group of nets to the idle processor. In other implementations, in order to avoid congestion, synchronization is performed after routing of each set of groups, even though other unrouted groups remain. In either implementation, N is generally kept small to achieve good load balance.

The processes of synchronizing at block 508 and routing unrouted nets at block 522 are repeated until there are no conflicting nets found by decision block 528. Once the netlist is routed with no conflicting nets, the routing data is stored at block 530.

One skilled in the art will recognize that the routing performed in the above embodiments may be performed using a number of different congestion resolution-based routing algorithms including, for example, Pathfinder, maze routing, A* search routing, versatile place and route, ROAD, etc. Since the nets of regions are routed with independent sets (i.e., region-specific) of local congestion data and are unaffected by the routing of nets in other regions, the regions may be processed in any order and deterministic results achieved. One skilled in the art will recognize that the regions of nets and groups of nets may be routed in parallel, sequentially, or any sub-combination thereof, so long as the routed nets and congestion data are merged at a synchronization block once all regions or groups of nets are independently routed.

The above embodiments are described as performing parallel routing using multiple processors. One skilled in the art will recognize that parallel processing may be performed on a number of different computing architectures, including performing concurrent process threads on multiple processors, multiple processing cores on a processor, or multiple networked computing systems.

Figure 6:
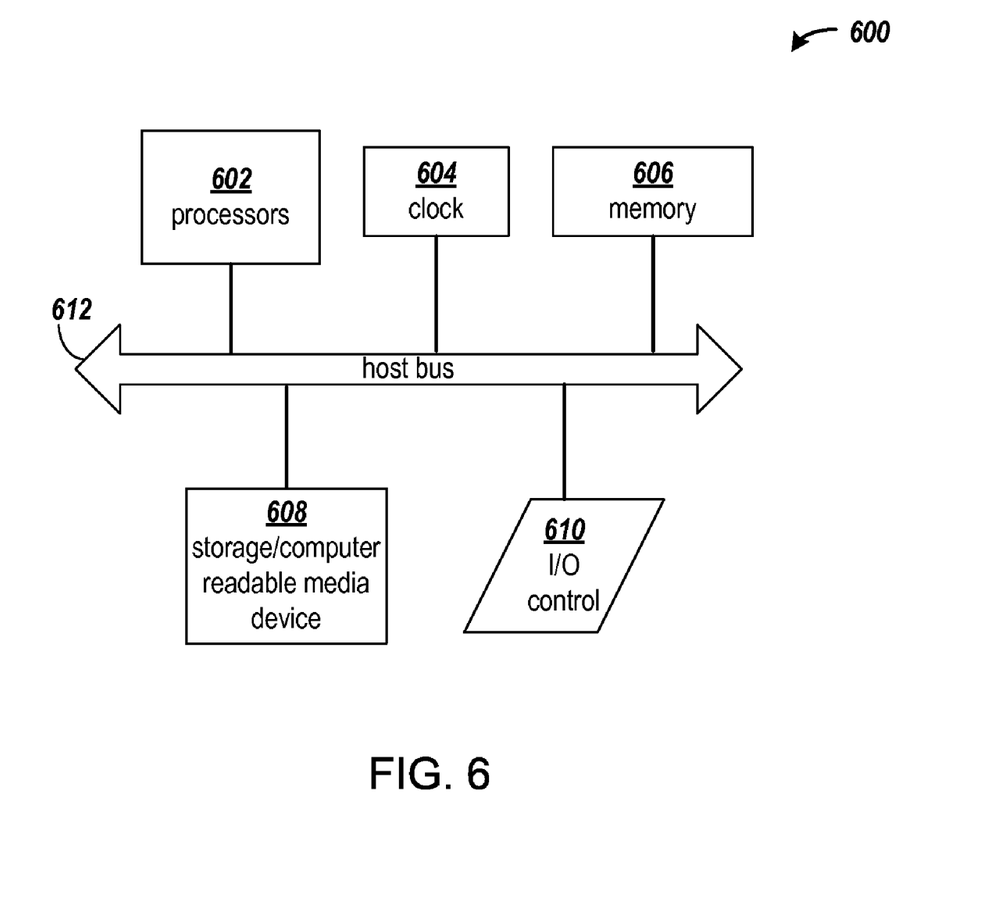
FIG. 6 illustrates a block diagram of a general purpose processor computing arrangement for performing routing processes.

FIG. 6 illustrates a block diagram of a computing arrangement that may be configured to implement the routing processes described herein. Those skilled in the art will appreciate that various alternative computing arrangements, including a plurality of processors and a memory arrangement configured with program code, would be suitable for hosting the processes and data structures and implementing the processes of the different embodiments of the present invention. The program code, encoded in a processor executable format, may be stored and provided via a variety of computer-readable storage media or delivery channels such as magnetic or optical disks or tapes, electronic storage devices, or as application services over a network.

Processor computing arrangement 600 includes two or more processors 602, a clock signal generator 604, a memory unit 606, a storage unit 608, and an input/output control unit 610 coupled to host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 602 may be one or more general-purpose processors, or a combination of one or more general-purpose processors and suitable co-processors, a multi-core processor, or one or more specialized processors (e.g., RISC, CISC, pipelined, etc.).

The memory arrangement 606 typically includes multiple levels of cache memory and a main memory. The storage arrangement 608 may include local and/or remote persistent storage such as provided by magnetic disks (not shown), flash, EPROM, or other non-volatile data storage. The storage unit may be read or read/write capable. Further, the memory 606 and storage 608 may be combined in a single arrangement.

The processor arrangement 602 executes the software in storage 608 and/or memory 606 arrangements, reads data from and stores data to the storage 608 and/or memory 606 arrangements, and communicates with external devices through the input/output control arrangement 610. These functions are synchronized by the clock signal generator 604. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different embodiments described herein.

Figure 7:
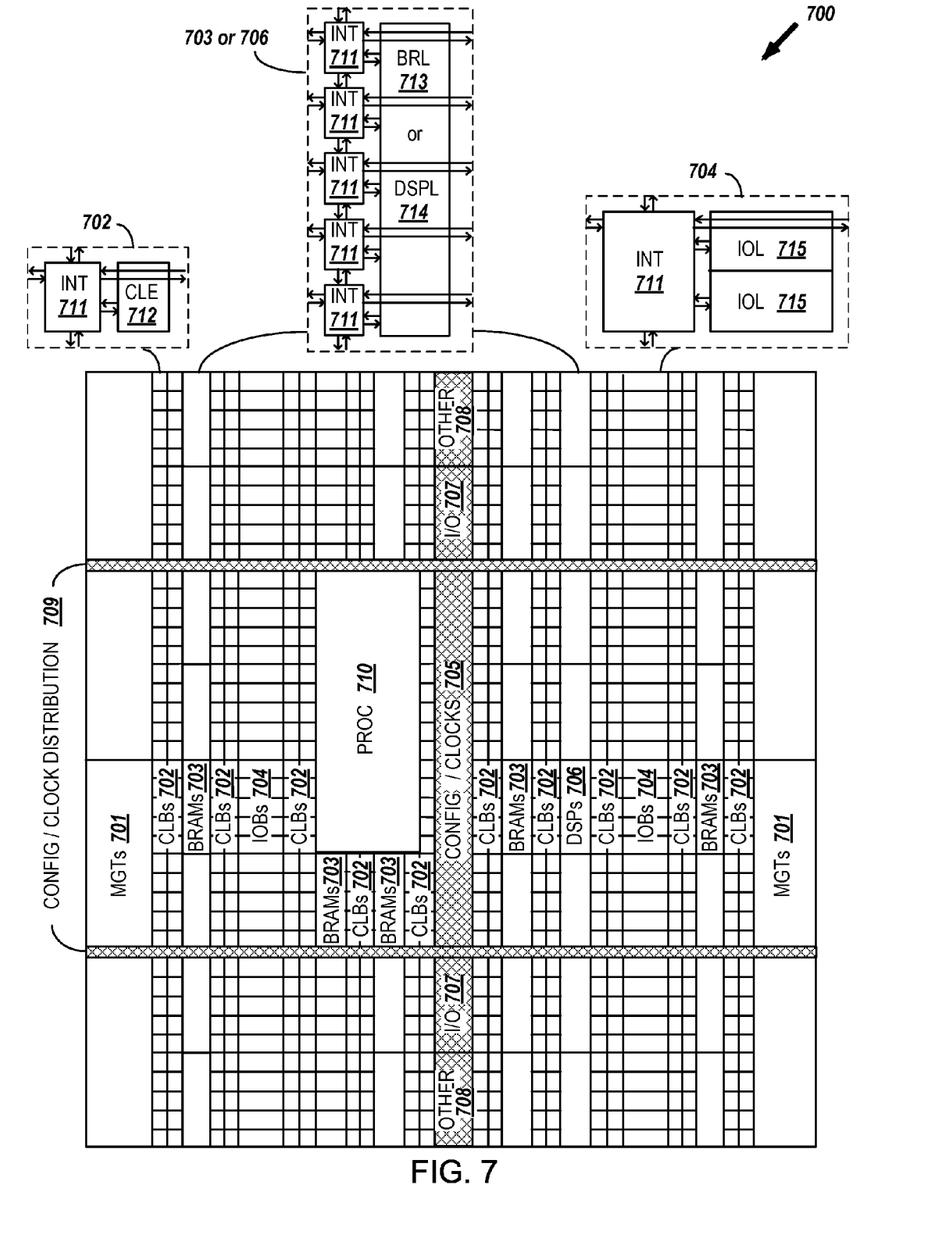
FIG. 7 illustrates a block diagram of an example programmable integrated circuit on which a circuit design may be routed.

FIG. 7 is a block diagram of an example field programmable gate array (FPGA) which may be used as a target device for place-and-route in accordance with one or more embodiments of the invention. FPGAs can include several different types of programmable logic blocks in the array. For example, FIG. 7 illustrates an FPGA architecture (700) that includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707), for example, clock ports, and other programmable logic 708 such as digital clock managers, analog-to-digital converters, system monitoring logic, and so forth. Some FPGAs also include dedicated processor blocks (PROC 710). While not shown, it will be appreciated that FPGA 700 also includes external and internal reconfiguration ports.

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element INT 711. A BRAM 703 can include a BRAM logic element (BRL 713) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used.

A DSP tile 706 can include a DSP logic element (DSPL 714) in addition to an appropriate number of programmable interconnect elements. With the FPGA as the target device, an inference pattern would be provided for the DSP logic element(s) available on the device. If portions of the design are found to be optimal, after timing analysis, those portions would be implemented by the DSP elements.

An IOB 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear, to facilitate the efficient implementation of user logic.

The embodiments of the present invention are thought to be applicable to a variety of systems and methods for routing circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for routing of a circuit design netlist, comprising:
   determining placement of a netlist of the circuit design on a target device;
   determining a processing time for each net in the netlist;
   defining a plurality of regions of the target device, wherein boundaries of the plurality of regions are defined to balance a total of the processing times of nets within each region of the plurality of regions with a total of the processing times of nets within each other region of the plurality of regions;
   concurrent with routing one or more nets of a first one of the plurality of regions by a first processor, routing one or more nets in at least one other of the plurality of regions by at least one other processor; and
   routing unrouted nets of the netlist.

2. The method of claim 1, wherein the defining of the plurality of regions includes defining the plurality of regions to be mutually exclusive.

3. The method of claim 2, wherein the routing of the one or more nets of the first one of the plurality of regions includes routing the one or more nets of the first region exclusively within the first region, and the routing of the one or more nets in the at least one other of the plurality of regions includes routing the one or more nets exclusively within the other region.

4. The method of claim 3, wherein the defining of the plurality of regions includes defining a buffer region between each of the plurality of regions of the target device.

5. The method of claim 1, wherein the routing of the one or more nets within each region including the first region and the at least one other region, includes routing the one or more nets as a function of congestion between the one or more nets.

6. The method of claim 1, wherein the determining of the processing time for each net includes determining the processing time as a function of a Manhattan distance between a source of the net and a load of the net that is furthest from the source.

7. The method of claim 1, wherein the determining of the processing time for each net includes determining the processing time as a function of a total distance from a source of the net to each load of the net.

8. The method of claim 7, wherein the determining of the processing time as a function of the total distance includes determining the total distance as a Manhattan distance from the source to all loads of the net.

9. The method of claim 1, wherein the determining of the processing time for each net in the netlist includes:
   determining a bounding box of the net; and
   determining a perimeter of the bounding box.

10. The method of claim 1, wherein determining the processing time for each net in the netlist includes:
    using a first cost function for non-critical nets in the netlist; and
    using a second cost function for critical nets in the netlist.

11. The method of claim 1, wherein the defining of the plurality of regions includes defining the plurality of regions to be equal in number to a number of processors available to perform the routing processes.

12. The method of claim 1, wherein the defining of the plurality of regions includes defining the plurality of regions to be greater in number than a number of processors available to perform the routing processes.

13. The method of claim 1, wherein routing unrouted nets of the netlist includes:
    deterministically grouping two of more unrouted nets of the netlist into a plurality of sub-netlists; and
    concurrently routing the plurality sub-netlists.

14. The method of claim 13, further comprising:
    determining congestion history between nets of the netlist; and wherein the concurrently routing the plurality of sub-netlists includes routing each net of each sub-netlist of the plurality of sub-netlists as a function of the determined congestion history between nets of the netlist and congestion between nets of the sub-netlist, the function not being dependent on congestion between nets of other sub-netlists in the plurality of sub-netlists.

15. The method of claim 13, wherein routing unrouted nets of the netlist further includes, in response to two or more nets of the netlist being routed through the same routing resource:
updating the congestion history between nets in the netlist;
undoing routes of the two or more nets of the netlist;
deterministically grouping the two of more nets into a revised plurality of sub-netlists; and
concurrently routing the sub-netlists of the revised plurality of sub-netlists as a function of the determined congestion history between nets of the netlist and congestion between nets of the sub-netlist, the function not being dependent on congestion between nets of other sub-netlists in the revised plurality of sub-netlists.

16. The method of claim 1, further comprising:
determining a respective first route for each net of the netlist as a function of a shortest path between a source of the net and one or more loads of the net, wherein the function is not dependent on congestion between nets of the netlist;
determining a congestion probability for each net in the netlist from the determined first route as a function of the shortest path; and
wherein the determining of the processing time for each net in the netlist determines the processing time as a function of a Manhattan distance between the source and at least one load of the net and the congestion probability.

17. A system for routing of a circuit design, the system comprising:
a plurality of processors; and
a memory arrangement coupled to the plurality of processors, wherein the memory arrangement is configured with instructions that when executed by one or more of the plurality of processors cause the plurality of processors to perform operations including:
determining a processing time for each net in the netlist;
defining a plurality of mutually exclusive regions of the target device, wherein boundaries of the plurality of mutually exclusive regions are defined to balance a total of the processing times costs of nets within each region of the plurality of regions with a total of the processing times of nets within each other region of the plurality of regions;
concurrent with routing nets within a first one of the plurality of mutually exclusive regions by one of the processors, routing nets within at least one other of the plurality of regions by another of the processors; and
routing unrouted nets of the netlist.

18. The system of claim 17, wherein the processing time for each net is determined as a function of a Manhattan distance between a source of the net and a load of the net that is furthest from the source.

19. The system of claim 17, wherein the plurality of processors are configured to perform operations including:
determining independent respective first route for each net of the netlist as a function of the shortest path between a source of the net and one or more loads of the net, wherein the function is not dependent on congestion between nets of the netlist;
determining a congestion probability for each net in the netlist from the determined first route; and
wherein determining a processing time for each net in the netlist determines the processing time as a function of a Manhattan distance between the source of the net and one or more loads of the net and the congestion probability.

20. An article of manufacture, comprising:
a non-transitory processor-readable storage medium configured with processor-executable instructions for processing a circuit design, the instructions when executed by a plurality of processors causing the plurality of processors to perform operations including:
routing the nets of the netlist as a function of the shortest path, wherein the function is not dependent on congestion between nets of the netlist;
determining a processing time for each net in the netlist
defining a plurality of mutually exclusive regions of the target device, wherein boundaries of the plurality of mutually exclusive regions are defined to balance a total of the processing times of nets within each region of the of the plurality mutually exclusive regions with a total of the processing times of nets within each other region of the plurality of mutually exclusive regions;
concurrent with routing nets within a first one of the plurality of mutually exclusive regions by one of the processors, routing nets within at least one other of the plurality of regions by another of the processors; and
routing unrouted nets of the netlist.

* * * * *